(12) United States Patent
Littrell (10) Patent No.: US 8,315,930 B2
(45) Date of Patent: Nov. 20, 2012

(54) SYSTEMS AND METHODS FOR CHARGING AN ELECTRIC VEHICLE USING BROADBAND OVER POWERLINES

(75) Inventor: Nathan Bowman Littrell, Gardnerville, NV (US)

(73) Assignee: General Electric Company, Schenectady, NY (US)

( * ) Notice: Subject to any disclaimer, the term of this patent is extended or adjusted under 35 U.S.C. 154(b) by 716 days.

(21) Appl. No.: 12/341,927

(22) Filed: Dec. 22, 2008

(65) Prior Publication Data

US 2010/0161483 A1    Jun. 24, 2010

(51) Int. Cl.
   *G06Q 40/00* (2012.01)
(52) U.S. Cl. .......................... 705/35; 320/109
(58) Field of Classification Search .......... 705/35; 320/109
   See application file for complete search history.

(56) References Cited

U.S. PATENT DOCUMENTS

| | | | |
|---|---|---|---|
| 3,775,593 A * | 11/1973 | Gieringer et al. | 235/378 |
| 4,052,655 A * | 10/1977 | Vizza | 320/109 |
| 4,090,577 A * | 5/1978 | Moore | 180/243 |
| 4,532,418 A | 7/1985 | Meese et al. | |
| 4,592,436 A * | 6/1986 | Tomei | 180/2.2 |
| 4,629,874 A | 12/1986 | Pugsley et al. | |
| 4,731,575 A | 3/1988 | Sloan | |
| 5,072,380 A | 12/1991 | Randelman et al. | |
| 5,101,200 A | 3/1992 | Swett | |
| 5,146,067 A | 9/1992 | Sloan et al. | |
| 5,202,617 A | 4/1993 | Nor | |
| 5,247,304 A | 9/1993 | D'Hont | |
| 5,266,947 A | 11/1993 | Fujiwara et al. | |
| 5,296,746 A * | 3/1994 | Burkhardt | 290/55 |
| 5,297,664 A | 3/1994 | Tseng et al. | |
| 5,306,999 A * | 4/1994 | Hoffman | 320/109 |
| 5,316,101 A * | 5/1994 | Gannon | 180/221 |
| 5,327,066 A | 7/1994 | Smith | |
| 5,351,052 A | 9/1994 | D'Hont et al. | |
| 5,351,187 A | 9/1994 | Hassett | |
| 5,428,363 A | 6/1995 | D'Hont | |
| 5,451,755 A * | 9/1995 | Duval et al. | 235/381 |
| 5,459,304 A | 10/1995 | Eisenmann | |
| 5,461,298 A * | 10/1995 | Lara et al. | 320/109 |
| 5,462,439 A * | 10/1995 | Keith | 320/109 |

(Continued)

FOREIGN PATENT DOCUMENTS

DE    10304284 A1    8/2004

(Continued)

OTHER PUBLICATIONS

European Patent Office Search Report, EP09178316, Reference 233500/14458, Application No./Patent No. 09178316.7-2221, Feb. 12, 2010, 7 pages.

(Continued)

*Primary Examiner* — Jagdish Patel
*Assistant Examiner* — Sara C Hamilton
(74) *Attorney, Agent, or Firm* — Global Patent Operation Armstrong Teasdale LLP (57) ABSTRACT

A method for delivering energy to an electric vehicle includes coupling the electric vehicle to an energy delivery point via a connector, receiving a unique identifier of the electric vehicle via the connector, determining an account associated with the identifier, delivering an amount of energy to the electric vehicle via the connector, and determining a transaction amount based on the amount of energy delivered to the electric vehicle by the energy delivery point.

15 Claims, 3 Drawing Sheets

U.S. PATENT DOCUMENTS

| | | | |
|---|---|---|---|
| 5,485,510 A | 1/1996 | Colbert | |
| 5,488,376 A | 1/1996 | Hurta et al. | |
| 5,491,483 A | 2/1996 | D'Hont | |
| 5,512,787 A * | 4/1996 | Dederick | 290/4 R |
| 5,513,525 A | 5/1996 | Schurmann | |
| 5,534,759 A | 7/1996 | Evans et al. | |
| 5,552,789 A | 9/1996 | Schuermann | |
| 5,563,491 A * | 10/1996 | Tseng | 320/109 |
| 5,577,109 A | 11/1996 | Stimson et al. | |
| 5,583,418 A * | 12/1996 | Honda et al. | 320/109 |
| 5,602,919 A | 2/1997 | Hurta et al. | |
| 5,604,342 A | 2/1997 | Fujioka | |
| 5,605,182 A | 2/1997 | Oberrecht et al. | |
| 5,614,808 A * | 3/1997 | Konoya et al. | 320/109 |
| 5,640,002 A | 6/1997 | Ruppert et al. | |
| 5,675,342 A | 10/1997 | Sharpe | |
| 5,684,379 A | 11/1997 | Svedoff | |
| 5,692,132 A | 11/1997 | Hogan | |
| 5,698,837 A | 12/1997 | Furuta | |
| 5,699,528 A | 12/1997 | Hogan | |
| 5,701,127 A | 12/1997 | Sharpe | |
| 5,704,046 A | 12/1997 | Hogan | |
| 5,742,229 A | 4/1998 | Smith | |
| 5,745,052 A | 4/1998 | Matsuyama et al. | |
| 5,774,882 A | 6/1998 | Keen et al. | |
| 5,797,085 A | 8/1998 | Beuk et al. | |
| 5,797,133 A | 8/1998 | Jones et al. | |
| 5,809,142 A | 9/1998 | Hurta et al. | |
| 5,828,738 A * | 10/1998 | Spaeth | 379/130 |
| 5,847,537 A * | 12/1998 | Parmley, Sr. | 320/109 |
| 5,878,215 A | 3/1999 | Kling et al. | |
| 5,887,266 A | 3/1999 | Heinonen et al. | |
| 5,905,247 A | 5/1999 | Ilen | |
| 5,955,717 A | 9/1999 | Vanstone | |
| 5,974,403 A | 10/1999 | Takriti et al. | |
| 5,987,140 A | 11/1999 | Rowney et al. | |
| 5,991,750 A | 11/1999 | Watson | |
| 5,998,963 A * | 12/1999 | Aarseth | 320/109 |
| 6,012,049 A | 1/2000 | Kawan | |
| 6,064,320 A | 5/2000 | d'Hont et al. | |
| 6,073,840 A | 6/2000 | Marion | |
| 6,081,205 A | 6/2000 | Williams | |
| 6,109,525 A | 8/2000 | Blomqvist et al. | |
| 6,112,152 A | 8/2000 | Tuttle | |
| 6,116,505 A | 9/2000 | Withrow | |
| 6,157,162 A * | 12/2000 | Hayashi et al. | 320/104 |
| 6,317,721 B1 | 11/2001 | Hurta et al. | |
| 6,340,935 B1 | 1/2002 | Hall | |
| 6,481,622 B2 | 11/2002 | Hjelmvik | |
| 6,513,015 B2 | 1/2003 | Ogasawara | |
| 6,547,133 B1 | 4/2003 | DeVries, Jr. et al. | |
| 6,586,668 B2 * | 7/2003 | Shugar et al. | 136/244 |
| 6,609,655 B1 | 8/2003 | Harrell | |
| 6,614,204 B2 | 9/2003 | Pellegrino et al. | |
| 6,656,778 B1 | 12/2003 | Chen et al. | |
| 6,673,479 B2 * | 1/2004 | McArthur et al. | 429/513 |
| 6,696,925 B1 | 2/2004 | Aiello, Jr. | |
| 6,714,844 B1 | 3/2004 | Dauner et al. | |
| 6,756,765 B2 * | 6/2004 | Bruning | 320/108 |
| 6,758,291 B1 * | 7/2004 | Koch | 180/11 |
| 6,836,737 B2 | 12/2004 | Petite et al. | |
| 6,910,439 B2 | 6/2005 | Baba et al. | |
| 6,963,186 B2 * | 11/2005 | Hobbs | 320/128 |
| 7,081,832 B2 | 7/2006 | Nelson et al. | |
| 7,141,321 B2 * | 11/2006 | McArthur et al. | 429/443 |
| 7,142,099 B2 | 11/2006 | Ross et al. | |
| 7,209,840 B2 | 4/2007 | Petite et al. | |
| 7,236,103 B2 | 6/2007 | Pammer et al. | |
| 7,239,226 B2 | 7/2007 | Berardi et al. | |
| 7,312,707 B1 | 12/2007 | Bishop et al. | |
| 7,338,335 B1 * | 3/2008 | Messano | 180/65.22 |
| 7,411,371 B2 * | 8/2008 | Hobbs | 320/128 |
| 7,429,112 B2 | 9/2008 | Metcalfe | |
| 7,434,636 B2 * | 10/2008 | Sutherland | 180/2.2 |
| 7,469,541 B1 * | 12/2008 | Melton et al. | 60/641.1 |
| 7,693,609 B2 | 4/2010 | Kressner et al. | |
| 7,885,893 B2 * | 2/2011 | Alexander | 705/40 |
| 8,019,483 B2 * | 9/2011 | Keefe | 700/286 |
| 2001/0026609 A1 | 10/2001 | Weinstein et al. | |
| 2002/0052754 A1 | 5/2002 | Joyce et al. | |
| 2002/0132144 A1 * | 9/2002 | McArthur et al. | 429/13 |
| 2003/0004792 A1 * | 1/2003 | Townzen et al. | 705/13 |
| 2003/0105662 A1 | 6/2003 | Koketsu et al. | |
| 2003/0120442 A1 | 6/2003 | Pellegrino et al. | |
| 2003/0129884 A1 | 7/2003 | Wakamatsu | |
| 2003/0146852 A1 | 8/2003 | O'Dell | |
| 2003/0209375 A1 * | 11/2003 | Suzuki et al. | 180/65.3 |
| 2004/0079799 A1 | 4/2004 | Symonds et al. | |
| 2004/0104814 A1 | 6/2004 | Christensen et al. | |
| 2004/0153782 A1 | 8/2004 | Fukui et al. | |
| 2004/0200899 A1 | 10/2004 | Jeng et al. | |
| 2005/0119010 A1 | 6/2005 | Yasukawa | |
| 2005/0273505 A1 | 12/2005 | Kim | |
| 2006/0012473 A1 | 1/2006 | Bishop et al. | |
| 2006/0041513 A1 | 2/2006 | Yuhara et al. | |
| 2006/0180647 A1 * | 8/2006 | Hansen | 235/375 |
| 2006/0193282 A1 | 8/2006 | Ikawa et al. | |
| 2006/0202862 A1 | 9/2006 | Ratnakar | |
| 2006/0259447 A1 | 11/2006 | Kings et al. | |
| 2007/0094069 A1 | 4/2007 | Berman | |
| 2007/0126395 A1 | 6/2007 | Suchar | |
| 2007/0255612 A1 | 11/2007 | Baraty | |
| 2008/0039979 A1 * | 2/2008 | Bridges et al. | 700/292 |
| 2008/0039980 A1 * | 2/2008 | Pollack et al. | 700/295 |
| 2008/0039989 A1 * | 2/2008 | Pollack et al. | 701/22 |
| 2008/0040223 A1 * | 2/2008 | Bridges et al. | 705/14 |
| 2008/0040263 A1 * | 2/2008 | Pollack et al. | 705/39 |
| 2008/0040295 A1 * | 2/2008 | Kaplan et al. | 705/412 |
| 2008/0040296 A1 * | 2/2008 | Bridges et al. | 705/412 |
| 2008/0040479 A1 * | 2/2008 | Bridge et al. | 709/224 |
| 2008/0052145 A1 * | 2/2008 | Kaplan et al. | 705/8 |
| 2008/0067974 A1 | 3/2008 | Zhang et al. | |
| 2008/0150284 A1 * | 6/2008 | Fein et al. | 290/44 |
| 2008/0150290 A1 * | 6/2008 | Fein et al. | 290/55 |
| 2008/0203966 A1 * | 8/2008 | Ward | 320/104 |
| 2008/0203973 A1 | 8/2008 | Gale et al. | |
| 2008/0228613 A1 * | 9/2008 | Alexander | 705/35 |
| 2008/0270227 A1 | 10/2008 | Al Amri | |
| 2008/0281663 A1 * | 11/2008 | Hakim et al. | 705/8 |
| 2009/0062967 A1 | 3/2009 | Kressner et al. | |
| 2009/0062997 A1 * | 3/2009 | Iwase et al. | 701/68 |
| 2009/0144150 A1 | 6/2009 | Sakakibara et al. | |
| 2009/0177580 A1 | 7/2009 | Lowenthal et al. | |
| 2009/0313033 A1 * | 12/2009 | Hafner et al. | 705/1 |
| 2009/0313034 A1 * | 12/2009 | Ferro et al. | 705/1 |
| 2009/0313103 A1 * | 12/2009 | Ambrosio et al. | 705/14.25 |
| 2009/0313104 A1 * | 12/2009 | Hafner et al. | 705/14.25 |
| 2010/0045232 A1 * | 2/2010 | Chen et al. | 320/109 |
| 2010/0065627 A1 * | 3/2010 | Outwater | 235/381 |
| 2010/0079004 A1 * | 4/2010 | Keefe | 307/80 |
| 2010/0082464 A1 * | 4/2010 | Keefe | 705/32 |
| 2010/0141203 A1 * | 6/2010 | Graziano et al. | 320/109 |
| 2010/0145837 A1 | 6/2010 | Graziano et al. | |
| 2010/0145885 A1 * | 6/2010 | Graziano et al. | 705/412 |

FOREIGN PATENT DOCUMENTS

| | | |
|---|---|---|
| EP | 0479290 A2 | 4/1992 |
| EP | 1205340 A1 | 5/2002 |
| EP | 1588930 A1 | 10/2005 |
| EP | 1862986 A1 | 5/2007 |
| GB | 2430529 A | 3/2007 |
| GB | 2438979 A | 12/2007 |
| JP | 05256038 A | 5/1993 |
| JP | 2002150337 A | 5/2002 |
| WO | 02063742 A1 | 8/2002 |
| WO | 2008073453 A1 | 6/2008 |
| WO | 2008107767 A2 | 9/2008 |

OTHER PUBLICATIONS

European Patent Office, Search Report for European Patent Application No. 09178452.0-2207, dated Mar. 23, 2010, 4 pages.

Radio Frequency Identification Tag Application for Tracking Vehicle Refueling, Maintenance, and Theft, XP000694521, IBM Technical Disclosure Bulletin, Mar. 1997, pp. 81-82, vol. 40, No. 03.

Green Car Versatile Plug, ip.com Prior Art Database, http://www.ip.com/pubview///IPCOM000177564D, IBM, Dec. 18, 2008, 4 pages.

C.M. Roberts, Radio Frequency Identification (RFID), Department of Information Sciences, Otago University, New Zealand, Science Direct, Computers & Security, 2006, pp. 18-26, vol. 25, Elsevier Ltd.

Patent Cooperation Treaty, PCT/US2009/065356, Notification of Transmittal of the International Search Report and the Written Opinion of the International Searching Authority, or the Declaration, Mar. 31, 2010, 14 pages.

Patent Cooperation Treaty, PCT/US2009/066930, Notification of Transmittal of the International Search Report and the Written Opinion of the International Searching Authority, or the Declaration, Jun. 25, 2010, 10 pages.

PCT, International Search Report for International Patent Application No. PCT/US2009/065229, dated Feb. 25, 2010, 4 pages.

EP Foreign Search Report for Application No. 09178313.42221 dated Jan. 26, 2010.

The Associated Press, Hawaii to be First with Electric Car Stations, Dec. 3, 2008, 2 pages, MSNBC.com.

IBM Technical Disclosure, Green Car Versatile Plug, IPCOM000177564D, Dec. 18, 2008.

Rich Housh & Kathy Ellington, "Plug-in Hybrid Electric Vehicle Smart Charging," available at http://www.eei.org/meetings/Meeting%20Documents/2009-04-05-Mon-Ellington.pdf (last visited Jul. 23, 2009).

\* cited by examiner

SYSTEMS AND METHODS FOR CHARGING AN ELECTRIC VEHICLE USING BROADBAND OVER POWERLINES

BACKGROUND OF THE INVENTION

The subject matter disclosed herein relates generally to distributing energy to electric vehicles and, more particularly, to identifying an electric vehicle for use in an energy distribution transaction.

As electric vehicles and/or hybrid electric vehicles gain popularity, an associated need to accurately manage delivery of electrical energy to them has increased. Moreover, a need to recognize revenue due to the utility that provides the energy has been created by the increased use of such vehicles.

At least some known systems enable distribution of power to an electric vehicle in order to charge one or more batteries that are used by the electric vehicle for propulsion. For example, at least some known systems couple a hardware apparatus to an electric vehicle battery. The hardware apparatus communicates power distribution data and/or power usage data related to the electric vehicle to a server. The apparatus may be coupled to the server through the power grid. The server operates to control power flows within the grid according to demand in order to maintain the stability of the grid. The server also coordinates with the apparatus to enable use of the electric vehicle battery as a storage component of power that may be re-allocated at a later time. Moreover, the hardware apparatus is coupled to a common electrical outlet, such as a household power outlet that may be found in, for example, a garage.

However, such known systems do not enable an energy distribution point to obtain a unique identifier of an electric vehicle for use in a transaction that includes delivering energy to the electric vehicle for use in metering energy delivered to the electric vehicle and/or charging the customer for energy delivered to the electric vehicle. As such, systems and methods that facilitate identifying an electric vehicle prior to delivering energy and/or recognizing revenue from the delivery of energy to electric vehicles is desirable.

BRIEF DESCRIPTION OF THE INVENTION

This Brief Description is provided to introduce a selection of concepts in a simplified form that are further described below in the Detailed Description. This Brief Description is not intended to identify key features or essential features of the claimed subject matter, nor is it intended to be used as an aid in determining the scope of the claimed subject matter.

In one aspect, a method is provided for delivering energy to an electric vehicle. The method includes coupling the electric vehicle to an energy delivery point via a connector, receiving a unique identifier of the electric vehicle via the connector, determining an account associated with the identifier, delivering an amount of energy to the electric vehicle via the connector, and determining a transaction amount based on the amount of energy delivered to the electric vehicle by the energy delivery point.

In another aspect, a system for providing energy delivery to an electric vehicle includes an energy delivery point and a server system over a network. The energy delivery point is coupled to the electric vehicle via a connector and is configured to receive a unique identifier of the electric vehicle via the connector, and to deliver an amount of energy to the electric vehicle via the connector. The server system is configured to determine an account associated with the identifier, and to determine a transaction amount related to the amount of energy delivered to the electric vehicle at the energy delivery point.

In another aspect, an energy delivery point is provided for use with a system for delivering electrical energy to an electric vehicle. The energy delivery point is configured to receive a unique identifier from the electric vehicle via a connector, deliver energy to the electric vehicle via the connector, and meter an amount of energy delivered to the electric vehicle.

BRIEF DESCRIPTION OF THE DRAWINGS

The embodiments described herein may be better understood by referring to the following description in conjunction with the accompanying drawings.

DETAILED DESCRIPTION OF THE INVENTION

In some embodiments, the term "electric vehicle" refers generally to a vehicle that includes one or more electric motors that are used for propulsion. Energy used to propel electric vehicles may come from various sources, such as, but not limited to, an on-board rechargeable battery and/or an on-board fuel cell. In one embodiment, the electric vehicle is a hybrid electric vehicle, which captures and stores energy generated by braking. Moreover, a hybrid electric vehicle uses energy stored in an electrical source, such as a battery, to continue operating when idling to conserve fuel. Some hybrid electric vehicles are capable of recharging the battery by plugging into a power receptacle, such as a general power outlet. Accordingly, the term "electric vehicle" as used herein may refer to a hybrid electric vehicle or any other vehicle to which electrical energy may be delivered, for example, via the power grid.

In some embodiments, the term "broadband over powerlines" (BPL) or "powerline communication" (PLC) refers generally to the exchange of information over a network, such as the Internet or an intranet, using electrical utility powerlines. BPL uses a digital signal that is injected into the utility grid at various points and travels through the utility wires and transformers to a designated destination. Messages that are exchanged using BPL may utilize communication devices that operate by modulating a carrier wave having between 20 kilohertz (kHz) and 200 kHz. Such a range is commonly used for home-control BPL devices that are plugged into normal household power outlets. BPL devices may also be configured to use a low-speed narrow-band communication method that operates over high-tension lines with frequencies between 15 kHz and 500 kHz. Moreover, BPL devices may be configured to use a high-speed narrow-band communication method that operates within a frequency range of 9 kHz to 500 kHz. As used herein, the terms "broadband over powerlines" and/or "powerline communication" should be understood by one of ordinary skill in the art to include any suitable carrier wave frequency range. Moreover, as used herein, the term "connector" should be understood by one of ordinary skill in the art to include any suitable cable, wire, and/or other connecting means for coupling an electric vehicle to an energy delivery point.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

Although described in connection with an exemplary energy delivery system environment, embodiments of the invention are operational with numerous other general purpose or special purpose computing system environments or configurations. The energy delivery system environment is not intended to suggest any limitation as to the scope of use or functionality of any aspect of the invention. Moreover, the energy delivery system environment should not be interpreted as having any dependency or requirement relating to any one or combination of components illustrated in the exemplary operating environment. Examples of well known energy delivery systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more controllers, computers, or other devices. Aspects of the invention may be implemented with any number and organization of components or modules. For example, aspects of the invention are not limited to the specific computer-executable instructions or the specific components or modules illustrated in the figures and described herein. Alternative embodiments of the invention may include different computer-executable instructions or components having more or less functionality than illustrated and described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

Technical effects of the systems and methods described herein include at least one of (a) coupling an electric vehicle to an energy delivery point via a connector, such as a power cable, wherein the connector may be an AC power cable or a DC power cable; (b) receiving a unique identifier of the electric vehicle via the connector; (e) accessing a database and searching for the identifier in the database; (d) determining an account associated with the identifier based on the search results; (e) determining whether to approve or deny service to the electric vehicle; (f) delivering an amount of energy to the electric vehicle if approved; (g) metering the amount of energy delivered by the energy delivery point to the electric vehicle; (h) determining a transaction amount related to the amount of energy delivered to the electric vehicle by the energy delivery point; and (i) deducting the transaction amount from the account.

Figure 1:
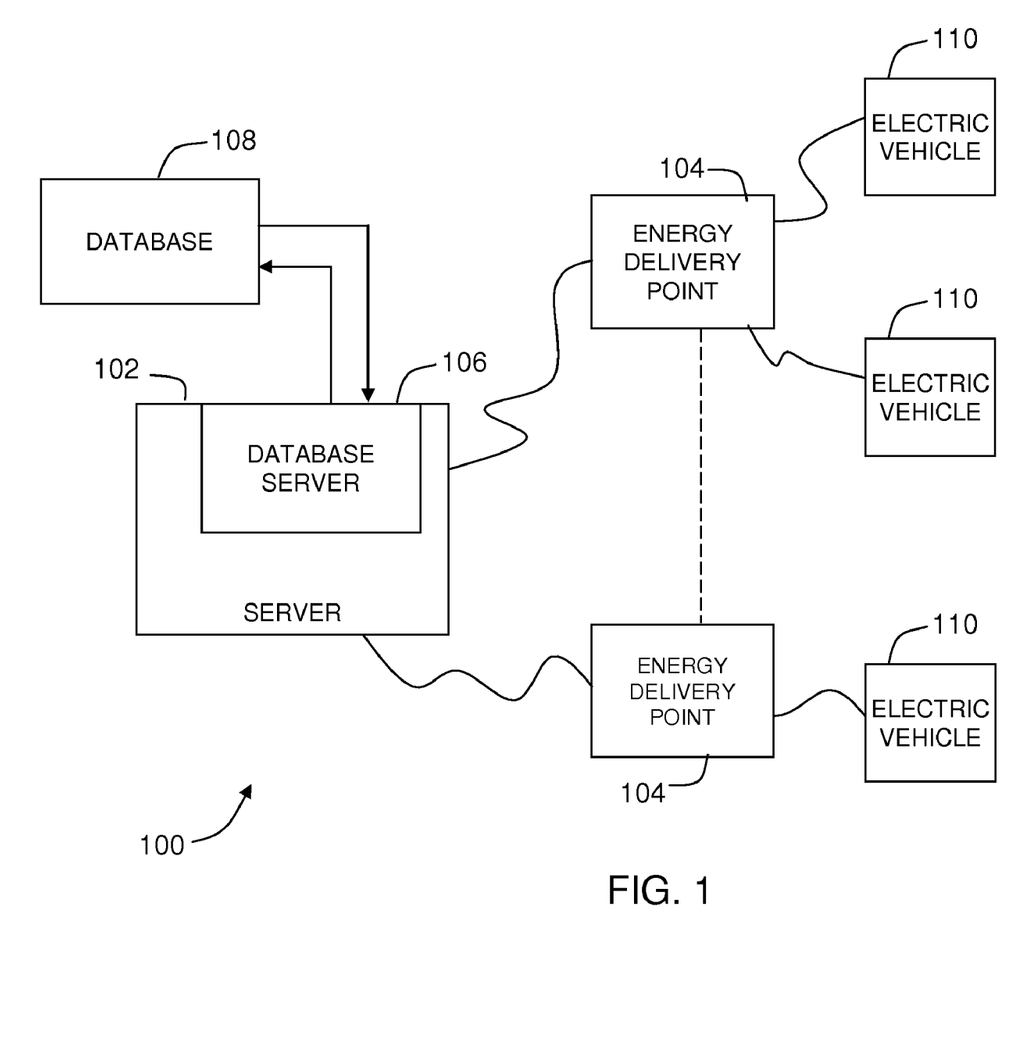
FIG. 1 is a simplified block diagram of an exemplary system for use in providing electricity to an electric vehicle.

FIG. 1 is a simplified block diagram of an exemplary system 100 for providing energy to an electric vehicle 110. In the exemplary embodiment, system 100 includes a server system 102 and an energy delivery point 104 that is coupled to server system 102. As shown in FIG. 1, server system 102 may be coupled to a plurality of delivery points 104. In one embodiment, delivery points 104 include a network link (not shown in FIG. 1) that enables each delivery point 104 to access server system 102 over a network, such as the Internet and/or an intranet. Delivery points 104 are interconnected to the Internet and/or an intranet through many interfaces including a network, such as a local area network (LAN), a wide area network (WAN), dial-in-connections, cable modems, wireless modems, and/or special high-speed Integrated Services Digital Network (ISDN) lines. A database server 106 is connected to a database 108 containing information on a variety of matters, such as account information related to electric vehicle energy distribution. In one embodiment, centralized database 108 is stored on server system 102 and is accessed directly via at least one delivery point 104. In an alternative embodiment, database 108 is stored remotely from server system 102 and may be non-centralized.

Moreover, in the exemplary embodiment, each delivery point 104 is capable of providing energy, such as electrical energy, to one or more electric vehicles 110. More specifically, each energy delivery point 104 is coupled to one or more electric vehicles 110 using a connector, such as a power cable, that enables both energy delivery to electric vehicle 110 and communication between energy delivery point 104 and electric vehicle 110. Each electric vehicle 110 stores the energy therein and uses the stored energy for propulsion, rather than, or in addition to, more conventional energy sources, such as gasoline.

As described in more detail below, each electric vehicle 110 includes a unique identifier that is used by delivery point 104 and/or server 102 to identify that electric vehicle 110 and/or an account associated with electric vehicle 110. For example, database 108 may include transactional and/or accounting data related to prepayment information associated with an amount of energy that has been paid for in advance for later distribution to electric vehicle 110. Moreover, database 108 may include historical energy distribution data, such as transaction dates, and/or an amount of energy delivered to electric vehicle 110 for each transaction. Further, database 108 may include historical payment information, such as prepayment dates and/or prepayment amounts.

The embodiments illustrated and described herein as well as embodiments not specifically described herein, but within the scope of aspects of the invention constitute exemplary means for providing metering of energy distribution for an electric vehicle, and more particularly, exemplary means for identifying an electric vehicle using a connector, such as a power cable, that facilitates both communication between the electric vehicle and an energy delivery point, and providing energy distribution and metering for the electric vehicle. For example, server system 102 or delivery point 104, or any other similar computer device that is programmed with computer-executable instructions as illustrated in FIG. 1, provides exemplary means for identifying an electric vehicle using BPL.

Figure 2:
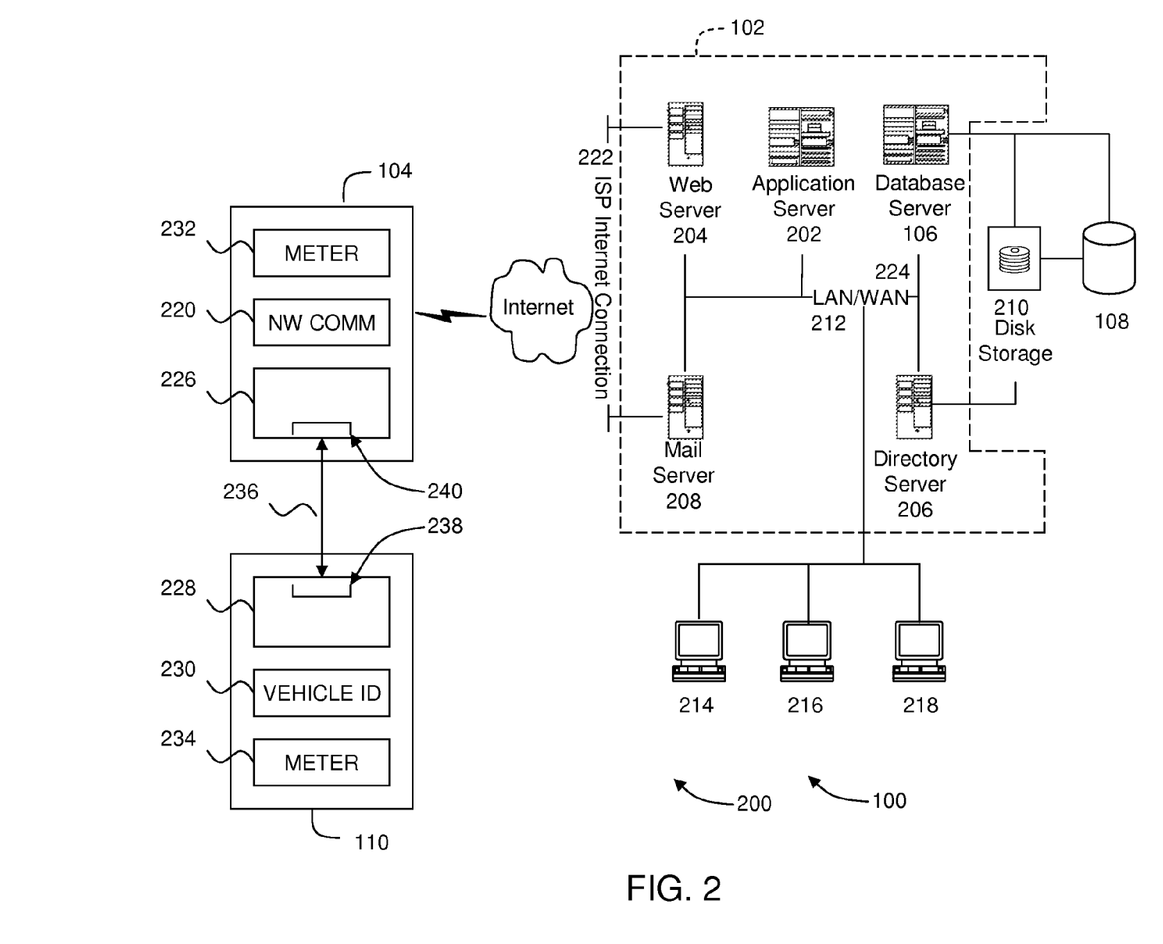
FIG. 2 is an expanded block diagram of an exemplary embodiment of a system architecture of the system shown in FIG. 1.

FIG. 2 is an expanded block diagram of an exemplary embodiment of a system architecture 200 of system 100 (shown in FIG. 1). Components in system architecture 200, identical to components of system 100, are identified in FIG. 2 using the same reference numerals used in FIG. 1. In the exemplary embodiment, system 200 includes server system 102 and energy delivery points 104. Server system 102 also includes database server 106, an application server 202, a web server 204, a directory server 206, and a mail server 208. A disk storage unit 210 is coupled to database server 106 and directory server 206. Examples of disk storage unit 210 may include, but are not limited to only including, a Network Attached Storage (NAS) device and a Storage Area Network (SAN) device. Database server 106 is also coupled to database 108. Servers 106, 202, 204, 206, 206, and 208 are coupled in a local area network (LAN) 212. Moreover, a system administrator workstation 214, a user workstation 216, and a supervisor workstation 218 may be coupled to LAN 212 to enable communication with server system 102. Alternatively, workstations 214, 216, and 218 may be coupled to LAN 212 using an Internet link or may be coupled through an intranet. In one embodiment, an owner or user of electric vehicle 110 may access server system 202 via web server 204 to access, for example, the user's account and/or a payment service that enables the user to pay for energy that has been delivered to electric vehicle 110 or will be delivered to electric vehicle 110. Moreover, in one embodiment, mail server 208 may be configured to send a message, such as an email message, to the user when the user's account balance falls below a predetermined threshold. Alternatively, a user may setup a periodic reminder, wherein mail server 208 transmits a message to the user at a configurable periodic rate or when the account balance reaches a predetermined threshold value as a reminder to prepay for energy to be delivered later to electric vehicle 110.

Each energy delivery point 104 includes a network communication module 220 that communicates with server system 102. For example, server system 102 is configured to be communicatively coupled to energy delivery points 104 to enable server system 102 to be accessed using an Internet connection 222 provided by an Internet Service Provider (ISP). The communication in the exemplary embodiment is illustrated as being performed using the Internet, however, any suitable wide area network (WAN) type communication can be utilized in alternative embodiments. More specifically, the systems and processes are not limited to being practiced using only the Internet. In addition, local area network 212 may be used, rather than WAN 224. Each energy delivery point 104 also includes a delivery point communication module 226 that enables energy delivery point 104 to communicate with one or more electric vehicles 110. In addition, local area network 212 may be used rather than WAN 224.

Moreover, in the exemplary embodiment, energy delivery points 104 are electrically and/or communicatively coupled to one or more electric vehicles 110. Each electric vehicle 110 includes a vehicle communication module 228 that enables electric vehicle 110 to communicate with energy delivery point 104. More specifically, vehicle communication module 228 enables electric vehicle 110 to acquire energy from energy delivery point 104 via delivery point communication module 226. In the exemplary embodiment, the connection between energy delivery point 104 and electric vehicle 110 is a single connector 236 that is capable of both delivering energy to electric vehicle 110 and transmitting messages between energy delivery point 104 and electric vehicle 110. More specifically, in the exemplary embodiment, vehicle communication module 228 includes a BPL modem 238 and delivery point communication module 226 includes a BPL modem 240.

To facilitate communication between electric vehicle 110 and server system 102 via energy delivery point 104, electric vehicle 110 includes a unique vehicle identifier 230 that is embedded within electric vehicle 110. In the exemplary embodiment, identifier 230 is implemented as a tag that is embedded in any communication sent to energy delivery point 104 from electric vehicle 110 and/or from energy delivery point to electric vehicle 110. For example, identifier 230 is included in any communication packet that is transmitted between vehicle communication module 228 and delivery point communication module 226 using connector 236. More specifically, identifier 230 is included in any communication packet that is transmitted between BPL modem 238 within vehicle communication module 228 and/or BPL modem 240 within delivery point communication module 226. In one embodiment, connector 236 is an alternating current (AC) power cable. In an alternative embodiment, connector 236 is a direct current (DC) power cable.

In the exemplary embodiment, identifier 230 is linked in database 108 to an account associated with electric vehicle 110, in which an account balance is maintained including prepayments that are made to the account by the account owner. Alternatively, identifier 230 may be linked to an account that is associated with a person, such that an account balance allocated among one or more electric vehicles 110. Further, in the exemplary embodiment, each energy delivery point 104 includes an energy meter 232 that tracks an amount of energy delivered to electric vehicle 110. Moreover, electric vehicle 104 includes an energy meter 234 that tracks an amount of energy received by electric vehicle 110.

During use, when a customer wishes to charge electric vehicle 110 via energy delivery point 104, electric vehicle 110 is recognized by energy delivery point 104 according to identifier 230. More specifically, in one embodiment, the customer plugs a single connector, such as connector 236, into an outlet (not shown) in electric vehicle 110. Energy delivery point 104 determines identifier 230 through communications with electric vehicle 110, wherein each message exchanged by energy delivery point 104 and electric vehicle 110 includes identifier 230 as a tag. Energy delivery point 104 then transmits identifier 230 to server system 102 in order to determine an account associated with identifier 230.

Once server system 102 has identified an account associated with identifier 230, server system 102 determines an account balance. Server system 102 may instruct energy delivery point 104 to enable service to electric vehicle 110 when the account balance meets a predetermined threshold. Alternatively, if the account balance does not meet a predetermined threshold, server system 102 may instruct energy delivery point 104 to deny service to electric vehicle 110 and display a message to the customer stating the reason for the denial. In such a case, server system 102 may issue a temporary credit to the account balance. In one embodiment, energy delivery point 104 meters energy delivery to electric vehicle using a different rate, such as a higher rate, when a temporary credit is issued. In an alternative embodiment, server system 102 may instruct energy delivery point 104 to deny service to electric vehicle 110 when the account associated with identifier 230 has been put into a hold state. A hold state may be placed on the account based on, for example, a delinquent payment by the customer and/or a report of electric vehicle 110 being stolen. In the exemplary embodiment, when service to electric vehicle 110 is enabled, energy delivery point 104 will deliver an amount of energy to electric vehicle 110 via the single connector 236. During the delivery, both energy delivery point 104 and electric vehicle 110 meter the amount of energy delivered and/or a transaction amount related to the amount of energy delivered, via delivery point meter 232 and vehicle meter 234, respectively. A final transaction amount is determined at the conclusion of the energy delivery, and the final transaction amount is transmitted to server system 102. Server system 102 then deducts the final transaction amount from the account balance. If the final transaction amount is greater than the account balance, server system 102 may issued a temporary credit using a different rate, such as a higher rate, as described above. In addition, in one embodiment, upon the conclusion of energy delivery, delivery point meter 232 and vehicle meter 234 compare the amount of energy delivered and/or the final transaction amount. If the comparison results in a match, then vehicle meter 234 generates a receipt. In one embodiment, the receipt is stored in vehicle meter 234. In another embodiment, the receipt is also transmitted to energy delivery point 104 for storage in server system 102.

Figure 3:
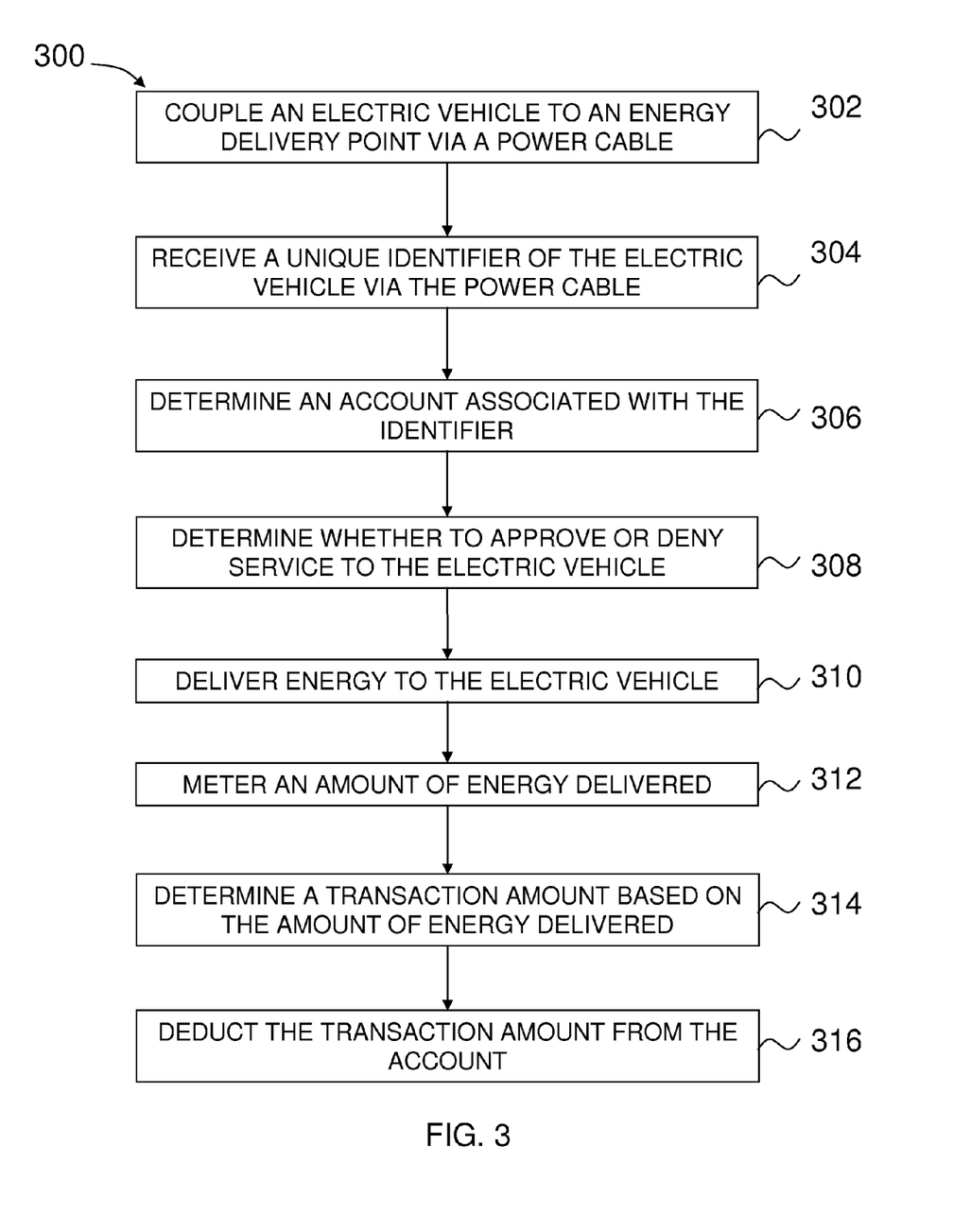
FIG. 3 is a flowchart illustrating an exemplary method for use in providing energy distribution to electric vehicle using the system shown in FIGS. 1 and 2.

FIG. 3 is a flowchart 300 illustrating an exemplary method for providing delivery of energy to electric vehicle 110 (shown in FIGS. 1 and 2). In the exemplary embodiment, electric vehicle 110 (shown in FIGS. 1 and 2) is coupled 302 to energy delivery point 104 (shown in FIGS. 1 and 2) via connector 236 (shown in FIG. 2). Energy delivery point 104 then receives 304 a unique identifier 230 (shown in FIG. 2) from electric vehicle 110 via connector 236. More specifically, BPL modem 238 (shown in FIG. 2) within vehicle communication module 228 (shown in FIG. 2) transmits identifier 230 to BPL modem 240 (shown in FIG. 2) within delivery point communication module 226 (shown in FIG. 2) via connector 236. In the exemplary embodiment, electric vehicle 110 and, more specifically, identifier 230 is associated with a customer account. Energy delivery point 104 then transmits the identifier 230 to server system 102 (shown in FIGS. 1 and 2). Server system 102 determines 306 an account associated with identifier 230. More specifically, energy delivery point 104 transmits identifier 230 to server system 102 using, for example, the Internet and/or an intranet. Server system 102 determines the user account associated with identifier 230 within database 108 (shown in FIGS. 1 and 2).

When identifier 230 has been read, a current balance of the customer account associated with identifier 230 is determined. In one embodiment, server system 102 then determines 308 whether to approve or deny energy delivery from energy delivery point 104 to electric vehicle 110. For example, if the current balance is less than a threshold amount, the customer is denied service at energy delivery point 104. In such an embodiment, the customer may also be prompted to insert a credit card or cash into a card reader within energy delivery point 104. As another example, service may be denied by server system 102 due to a stolen car report associated with electric vehicle 110. In the exemplary embodiment, the current account balance may be increased by the account owner remotely using, for example, user workstation 216 (shown in FIG. 2). For example, the customer may login to server system 202 via user workstation 216 in order to access a payment program that enables the customer to designate a payment amount to be applied to the account balance. The customer also designates a payment source including, but not limited to only including, a credit card, a debit card, and/or a banking account. The payment amount is then credited to the account balance.

In the exemplary embodiment, an amount of energy is delivered 310 to electric vehicle 110 by energy delivery point 104 via connector 236. During energy delivery, the amount of energy delivered is metered 312. A transaction amount is determined 314 based on an actual amount of energy delivered to electric vehicle 110 at energy delivery point 104. More specifically, delivery point meter 232 (shown in FIG. 2) meters the amount of energy delivered. In one embodiment, energy delivery point 104 determines a transaction amount based on the amount of energy delivered and transmits the transaction amount to server system 102. In an alternative embodiment, energy delivery point 104 transmits the amount of energy delivered to server system 102, and server system 102 determines the transaction amount based on the amount of energy delivered. In the exemplary embodiment, the transaction amount is then compared to the current balance in the customer account. If the transaction amount is less than the current balance, the transaction amount is deducted 316 from the current balance. The new balance is then stored in database 108. In one embodiment, the new balance is transmitted by server system 102 to energy delivery point 104 and displayed to the customer. In an alternative embodiment, the new balance is also transmitted to electric vehicle 110 by energy delivery point 104 and displayed to the customer via vehicle meter 234. If the current balance is less than the transaction amount, the customer account may be credited with the difference between the transaction amount and the current balance and the customer billed for the difference at a later time. In such an embodiment, the billing rate may be changed for any energy distributed on credit. Alternatively, the customer may be prompted to submit payment at energy delivery point 104. For example, the customer may be prompted to insert a credit card into a card reader within energy delivery point 104. In the exemplary embodiment, a confirmation of the receipt of the delivered energy is generated 308 by vehicle meter 234. The receipt may be used by the customer to verify an amount of energy delivered and/or a cost per unit energy. The receipt may be generated by electric vehicle 110 and stored in electric vehicle 110 and database 108. Alternatively, the receipt may be generated by server system 102, stored in database 108, and transmitted to electric vehicle 110 via energy delivery point 104. In addition, in one embodiment, an adjusted current balance may be displayed to the customer via energy delivery point 104 to reflect a deduction of the transaction amount from the account.

Described in detail herein are exemplary embodiments of methods, systems, and computers that facilitate delivering energy to vehicles, such as electric vehicles. More specifically, the embodiments described herein facilitate identifying an electric vehicle at an energy delivery point using broadband over powerline communication over the same connector or cable that delivers energy to the electric vehicle. Utilizing a single connector to couple the electric vehicle to the energy delivery point facilitates more quickly identifying the electric vehicle so that energy delivery may begin, and also facilitates automatic deduction of a transaction amount from an account. Such an automatic deduction facilitates time savings for a customer and greater ease in collecting revenue for an energy distribution utility. Faster automatic identification of the electric vehicle facilitates enabling a greater number of customers to access the same energy delivery point during a given time period, thereby resulting in greater revenue for the energy distribution utility.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other assembly packages and methods.

While the invention has been described in terms of various specific embodiments, those skilled in the art will recognize that the invention can be practiced with modification within the spirit and scope of the claims.

What is claimed is:

1. A method for delivering energy to an electric vehicle, said method comprising:
   receiving, by an energy delivery device coupled to the electric vehicle via a connector, a unique identifier of the electric vehicle via the connector;
   determining, by a server system coupled to said energy delivery device over a network, an account associated with the identifier;
   delivering, by the energy delivery device, an amount of energy to the electric vehicle via the connector;
   determining, by the server system, a transaction amount to charge the account based on the amount of energy delivered to the electric vehicle by the energy delivery device;
   comparing the amount of energy delivered by the energy delivery device and the amount of energy received at the electric vehicle when the transaction amount has been determined; and
   performing an action when the amount of energy delivered at the energy delivery device is equal to the amount of energy received at the electric vehicle.

2. A method in accordance with claim 1, wherein coupling the electric vehicle to the energy delivery device comprises coupling the electric vehicle to the energy delivery device via one of an alternating current (AC) power cable and a direct current (DC) power cable.

3. A method in accordance with claim 1, wherein determining an account comprises:
   accessing a database;
   searching for the identifier in the database; and
   determining the account based on the search results.

4. A method in accordance with claim 3, wherein determining the account further comprises transmitting the identifier from the energy delivery device via a network to said server system coupled to the database.

5. A method in accordance with claim 1, wherein determining a transaction amount comprises metering the amount of energy delivered at the energy delivery device to the electric vehicle.

6. A method in accordance with claim 5, wherein metering the amount of energy delivered comprises metering the amount of energy delivered at the energy delivery device and an amount of energy received at the electric vehicle.

7. A method in accordance with claim 6, wherein performing an action comprises generating a receipt.

8. A method in accordance with claim 1, further comprising:
   transmitting the amount of energy delivered to said server system;
   determining the transaction amount based on the amount of energy delivered; and
   deducting the transaction amount from the account.

9. A system for providing energy delivery to an electric vehicle, said system comprising:
   an energy delivery device coupled to the electric vehicle via a connector, said energy delivery device configured to:
      receive a unique identifier of the electric vehicle via said connector;
      deliver an amount of energy to the electric vehicle via said connector;
      compare the amount of energy delivered to the electric vehicle and the amount of energy received from said energy delivery device; and
      perform an action when the amount of energy delivered to the electric vehicle is equal to the amount of energy received from said energy delivery device; and
   a server system coupled to said energy delivery device over a network, said server system configured to:
      determine an account associated with the identifier; and
      determine a transaction amount to charge the account based on the amount of energy delivered to the electric vehicle by said energy delivery device.

10. A system in accordance with claim 9, wherein said connector comprises one of an alternating current (AC) power cable and a direct current (DC) power cable.

11. A system in accordance with claim 9, wherein said server system comprises a database and a computer coupled to said database, said computer is configured to:
   access said database;
   search for the identifier in said database; and
   determine the account based on the search results.

12. A system in accordance with claim 11, wherein said energy delivery device is configured to transmit the identifier to said server system via a network.

13. A system in accordance with claim 9, wherein said energy delivery device comprises a meter configured to determine the amount of energy delivered to the electric vehicle, and said electric vehicle comprises a meter configured to determine an amount of energy received from said energy delivery device.

14. A system in accordance with claim 13, wherein said energy delivery device is configured to
   perform an action, wherein the action includes generating a receipt.

15. A system in accordance with claim 13, wherein said meter is further configured to:
   transmit the amount of energy delivered to said server system;
   said server system is configured to determine the transaction amount based on the amount of energy delivered; and
   to deduct the transaction amount from the account.

* * * * *